United States Patent [19]

Hinz et al.

[11] Patent Number: 4,877,668

[45] Date of Patent: Oct. 31, 1989

[54] PRESSURE VESSEL SIGHT GLASSES

[75] Inventors: Paul Hinz, Mainz-Finthen; Helmut Dislich, Budenheim; Gerhard Weber, Schornsheim, all of Fed. Rep. of Germany

[73] Assignee: Schott Glaswerke, Mainz, Fed. Rep. of Germany

[21] Appl. No.: 4,404

[22] Filed: Jan. 20, 1987

[30] Foreign Application Priority Data

Jan. 20, 1986 [DE] Fed. Rep. of Germany ....... 3601500

[51] Int. Cl.$^4$ .......................... B32B 1/04; B32B 3/02
[52] U.S. Cl. ........................................ 428/68; 428/75; 428/76; 73/323
[58] Field of Search .................. 73/323, 326, 328–333; 428/80, 68, 70, 75, 76

[56] References Cited

U.S. PATENT DOCUMENTS

| | | | |
|---|---|---|---|
| 3,925,575 | 12/1975 | Church et al. | 427/226 |
| 3,963,798 | 6/1976 | Miller | 427/44 |
| 4,671,110 | 6/1987 | de Kock | 73/323 |

*Primary Examiner*—Nancy A. B. Swisher
*Attorney, Agent, or Firm*—Millen, White & Zelano

[57] ABSTRACT

A pressure vessel sight glass, especially a tempered glass, is protected against the corrosive attack of normally alkaline, boiler feed water heated up to 300° C., by providing the sight glass with a metallic oxide coating consisting essentially of $SnO_2$, optionally combined with $Cr_2O_3$. The coating is preferably applied as a sprayed solution of soluble salt convertible to the oxide.

10 Claims, 1 Drawing Sheet

PRESSURE VESSEL SIGHT GLASSES

BACKGROUND OF THE INVENTION

This invention relates to corrosion-resistant sight or inspection glasses for pressure vessels.

Alkaline aqueous solutions are frequently utilized in pressure vessels at temperatures of up to 300° C., but the sight glasses incorporated in a conventional manner in the side of such pressure vessels generally do not exhibit adequate resistance to deterioration, irrespective of whether the glasses are hard or soft glasses, tempered or not. As a consequence, to avoid failure of the sight glass during operation of such a vessel, the sight glasses must be exchanged frequently, which is expensive.

As an attempt to remedy the problem, mica plates have been placed in front of the sight glasses to protect the latter. Whereas, this results in an improvement since mica is more stable with respect to alkalis than the glasses employed, protection is limited and depends on the quality of the micas. Additionally, on account of the diminishing availability of optical grade micas, the cost thereof has risen dramatically in recent times and has even exceeded the price of the sight glasses to be protected. Consequently, the use of mica will become a prohibitively expensive solution to the problem of failure of sight glasses, particularly since the availability of optical grade mica is expected to become worse in the future.

Another attempted solution has been to coat the sight glasses with a synthetic resin on at least the interior side, i.e., the side of the glass in contact with the fluid inside the pressure vessel. One drawback of this expedient is that the temperature stability of the plastics employed is unsatisfactory above 200° C. whereas boilers are frequently operated up to 300° C. Even below 200° C., damage to the synthetic resin and resultant separation from the glass substrate occur due to steam diffusion and erosion from the turbulent conditions at the boiler window. In all these cases, the entire sight glass must be replaced.

For these reasons, another suggested solution to the problem is based on providing the inspection glass with a transparent synthetic resin sheet resistant to aggressive, especially alkaline, solutions. This sheet is merely fixed in place mechanically and thus can be exchanged without replacing the glass as well. For this purpose, transparent fluoropolymers have been suggested, especially polytetrafluoroethylenehexafluoropropylene copolymers according to Austrian Pat. No. 329,790. These polymers are stable against typical, alkaline boiler feed waters containing phosphate and carbonate ions at a pH of 10 and at up to 200° C. But here again, there is the disadvantage that the stability is limited to 200° C. Another disadvantage is that steam diffuses through the sheet into the space between the sheet and the sight glass and hampers visibility. Also, the cost of such perfluoropolymers is considerable and, in conjunction with the aforementioned drawbacks, this solution to the problem, for all practical purposes, is restricted to a few special cases.

SUMMARY OF THE INVENTION

An object of this invention is to provide corrosion-resistant inspection or sight glasses withstanding higher operating temperatures, i.e., up to 300° C.

Another object of the invention is to provide a process for the application of coatings to boiler sight glasses so as to impart corrosion and erosion resistance to these sight glasses at temperatures up to 300° C.

Upon further study of the specification and appended claims, further objects and advantages of this invention will become apparent to those skilled in the art.

To attain these objects, the sight glasses are coated at least on the interior side with stannic oxide ($SnO_2$), and preferably in admixture with chromic oxide ($Cr_2O_3$). The coatings are preferably applied by spraying a solution of a precursor of the oxides, e.g., $SnCl_4$ and/or $CrCl_3$, on the glass at about 500–700° C.

The sight glasses of this invention are particularly useful in applications where the boiler feedwater has a pH above 7, especially in the range of 8 to 10, and especially where the temperature in the boiler is above about 200° C., particularly above about 240° C., and more particularly at about 270° C.

The sight glasses according to the present invention are thus characterized in that they are coated, at least on the interior side with one or more firmly adhering metallic oxide layers exhibiting a substantially higher corrosion resistance than the substrate glasses proper, especially against alkaline aqueous solutions.

Although corroison-preventive metallic oxide layers are known, they have not been disclosed as useful on sight glasses. The closest state of the art relates to coated E-glass fibers resistant to alkaline cements, with the use of tin oxide and zirconium oxide as the metallic oxides showing a limited protection against alkaline attack. However, since protection has been directed to operations at ambient temperature, the behavior of the aforementioned metallic oxides at higher temperatures up to 300° C. was neither known nor predictable; this holds true as well for other oxides and mixed oxides. The coated E-glass fibers are described in J. of Materials Science Letters 4, 123–134 (1985).

Although pertinent manuals and textbooks contain statements regarding the solubility of various oxides in forms such as powders, molded elements, or similar materials, these teachings cannot be applied analogously to coatings. The reason for this is probably that not only is the chemical characteristic of the oxide important, but so is the structure of the layer, the bulk density of which can be high or low. In case of a low bulk density, the coating is more porous and thus more vulnerable and more permeable; at a high bulk density, the layer is less subject to attack and less permeable. The bulk density, in turn, depends on the type of coating method and the process parameters selected, and is also affected by the chemical and surface characteristics of the substrate to be coated. The same hold true for obtaining satisfactory adhesion of the oxide layer to the substrate. In the present invention the tin oxide is produced in a spraying process on about 600° C. hot glass surfaces step by step, that means one coating after the other leading to a multicoating package system. This is done by using oscillating nozzles. Surprisingly so produced coating systems are very stable. We have not been able to produce coatings of similar quality by using other coating methods as dip coating for instance.

A special feature of the present invention resides in the use of tempered inspection glasses. The tempering step is generally conducted after the coating step. Accordingly, the oxide layers must withstand the tempering schedule, i.e., temperatures of up to 800° C., and sudden quenching resulting in a rapid change in expansion at various coefficients of expansion of the substrate and the layer. The oxide layers must likewise not lose their ability to function as corrosion preventives, i.e., no tearing or even crackling of the coating nor detachment from the substrate.

This invention is applicable to all conventional sight glass compositions, especially to borosilicate glasses and soda lime glasses.

Sight glass construction is well known, the thickness of the sight glass being generally about 7 to 30 mm and the diameter about 3 to 25 cm. For additional information on conventional sight glass construction for pressure vessels, attention is invited to the following reference, incorporated herein: Leaflet 3/84 PAW Phönix Armaturen-Werke, Bregel GmbH, Esch-borner Landstrabe 41–51, 6000 Frankfurt/M-Rödelheim, West-Germany.

Although many corrosion-protection layers are known from the prior art, among these $SnO_2$, they are effective only against mild stress, for example in accordance with DIN 50 018. In contrast, in the case of boiler feed waters up to 300° C., the attack of network linkages, e.g., Si—O—Si—, is so massive that, within days, several millimeters of thickness are normally eroded. Therefore, there was reason for a person skilled in the art of preparing sight glasses to believe that the known measures for protecting against mild attack would fail under the conditions found in boilers. Clear proof of this fact is the use of the extremely expensive mica cover plates, an expedient almost exclusively employed in todays's practice. Thus, besides mica and the fluoropolymers which have only limited usefulness, no other satisfactory protection was known heretofore for pressure vessel sight glasses. This confirms the observation although many corroison protection coatings were known for other purposes, they were not believed to be applicable to the problems solved by the present invention.

For the purpose of applying the coating to the sight glass, thick layers of generally about 0.3 to 1 micron are generally sprayed on in a single process.

Following this process the sight glass is heated up to 500°–700° C. in an oven, and coated by spraying outside of the oven using oscillating nozzles so producing one coating after the other as described on page 4. All other details see examples. Coating thickness of at least 0,3 micron is necessary because of wanted long term use. Coating thickness of more than 1 micron is difficult to realize because of problems with optical quality and because the sight glass cools down to temperatures not sufficient for thermal degradation of the tin compound.

The resultant thick coatings are somewhat non-homogeneous optically, but this does not represent any serious disadvantage for their use as sight glasses.

A thus-produced $SnO_2$ coating has an increased electrical conductivity and infrared reflection which, in case of usage as sight glasses, is not only not required, but in some cases is even undesirable. These deleterious properties can be mitigated or entirely eliminated by using mixed oxides of $SnO_2$ and $Cr_2O_3$. Infrared reflection is especially undesirable in the case of tempering of sight glasses, since the heating of the sight glasses to the required temperatures of up to 800° C. is hindered by heat reflection. For this reason, the incorporation of $Cr_2O_3$ is a preferred measure, as already described, in principle, in DAS 1,204,369. The proportions of $Cr_2O_3$ to $SnO_2$ are 0.3–1.0 preferred 0.54 in percent by weight.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, all temperatures are set forth uncorrected in degrees Celsius; unless otherwise indicated, all parts and percentages are by weight.

EXAMPLE 1

A coating of $SnO_2$ having a thickness of about 0.8 um (micron) is provided from a solution of:

845 ml methyl alcohol
155 ml tin tetrachloride which is sprayed onto a boiler sight glass at temperatures of up to 700° C. The coating is transparent for visible light. Long-wave infrared light of the wavelengths 24 3 um, required for tempering, is reflected to an extent of above 70% and thus retards the required heating-up process for tempering.

EXAMPLE 2

3.8 g of chromium(III) chloride × 6 $H_2O$ is added to a solution according to Example 1 and is dissolved therein. At 700° C., a coating having a thickness of about 0.8 um is sprayed onto a boiler sight glass. The coating is transparent to visible and long-wave IR light of 22 3 um. The thus-coated inspection glasses can be prestressed in a normal tempering process without the coating exerting any deleterious influence on the tempering operation.

EXAMPLE 3

Coatings produced according to Examples 1 and 2, consisting essentially of $SnO_2$ and optionally $Cr_2O_3$ show excellent protective properties in alkaline boiler waters. Thus, this coating prevents glass corrosion over at least 70 hours at 225° C. and 25 bar in an autoclave at a pH of 10. In comparison, unprotected borosilicate glass, highly resistant per se, is dissolved to the extent of 0.6 mm in the thickness during the same time period.

BRIEF DESCRIPTION OF THE DRAWINGS

In the Figure, the base glass 1 is shown to be grooved, with a metallic oxide layer, 2 superimposed thereon.

For example, the glass thickness is 17 or 21 mm.

The base glass 2 is coated with a metallic oxide layer which consists of $SnO_2$. The thickness of the coating is about 0.3 μm to 1 μm.

The base glass 2 shows a plane margin 5 which is used as a sealing surface in case of mounting the sight glass 1. The plane outer surface 11 is also used as a sealing surface.

Figure 1:
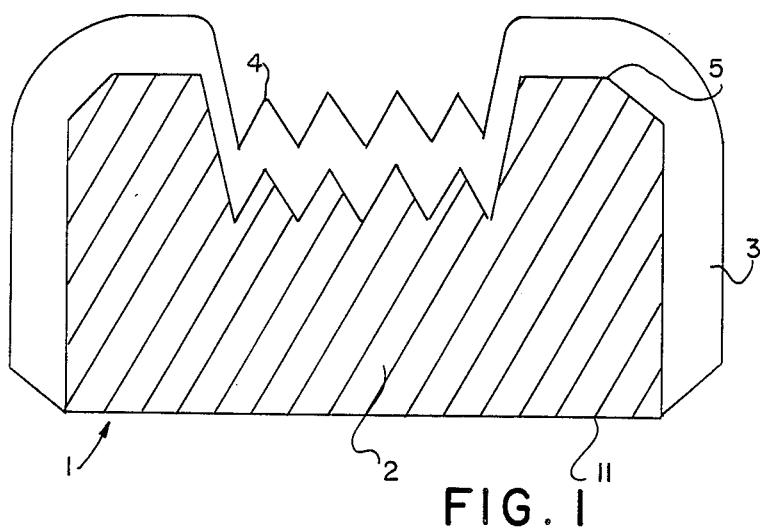
FIG. 1 shows a cross-section of the pressure vessel sight glass 1. The base glass 2 comprises grooves 4 which act as prisms. The prisms visualize the water level in a better way than plane glass disks if they are build into a boiler in that way that the grooves contact the water.
Figure 2:
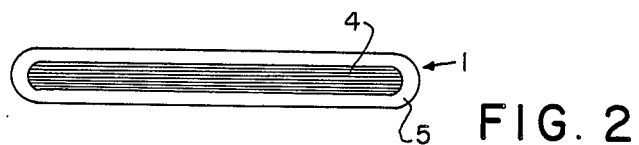

FIG. 2 shows a plane view of the sight glass 1. The length is about 115 to 340 mm.

Figure 3:
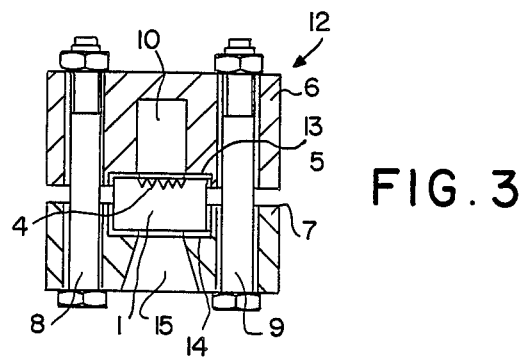

FIG. 3 shows a liquid level gauge 12 which consists of the sight glass 1 mounted between base plate 6 and counter plate 7. The plates 6 and 7 are fastened by screws 8 and 9.

Between the sight glass 1 and the plates 6, 7 there are disposed two gasket rings 13 and 14.

Base plate 6 shows a channel 10 which contains the liquid to be inspected. Counter plate 7 has an inspection hole 15 formed as a cone.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pressure vessel sight glass suitable for pressure vessels containing boiler feed water at a temperature up to about 300° C., said sight glass being mounted between a base plate and a counter plate, for insertion into or attachment to said pressure vessel, said sight glass having a thickness of 7-30 mm and being protected against the corrosive action of boiler feed water by a transparent coating of stannic oxide additionally containing chromic oxide.

2. A sight glass according to claim 1, wherein the coating is of a thickness of about 0.3 to about 1 $\mu$m, obtained by a method comprising a step of spraying a solution of stannic salt convertible into stannic oxide onto the glass at an elevated temperature.

3. A sight glass according to claim 2, wherein the chromic oxide is present in a concentration of 0.3-1.0% based on the weight of the stannic oxide.

4. A sight glass according to claim 1, wherein the glass is a borosilicate glass.

5. A sight glass according to claim 4, wherein the chromic oxide is present in a concentration of 0.3-1.0% based on the weight of the stannic oxide.

6. A sight glass according to claim 1, wherein the chromic oxide is present in a concentration of 0.3-1.0% based on the weight of the stannic oxide.

7. A sight glass according to claim 1, wherein the glass is heated to 500°-700° C. for said spraying step.

8. A sight glass according to claim 7, wherein the salt comprises $SnCl_4$.

9. A sight glass according to claim 1, wherein the glass is circular and has a diameter of the glass is 3 to 25 cm.

10. A sight glass according to claim 1, wherein said sight glass is tempered.

* * * * *